United States Patent

[11] 3,628,907

[72] Inventor John Gaylord Fish
Garland, Tex.
[21] Appl. No. 748,946
[22] Filed July 31, 1968
[45] Patented Dec. 21, 1971
[73] Assignee Texas Instruments Incorporated
Dallas, Tex.

[54] METHODS OF USING ACETAL-CONTAINING ORGANOSILICON COMPOSITIONS TO IMPROVE THE WATER-REPELLENCY OF CELLULOSE CONTAINING MATERIALS
9 Claims, No Drawings

[52] U.S. Cl. ........................................ 8/120,
8/116.4, 117/161 ZA, 260/448.2 B, 260/46.5 Y,
117/135.5
[51] Int. Cl. ..................................... D06m 13/18
[50] Field of Search .......................... 8/120, DIG.
1, 116.4; 260/448.2 B; 117/161 ZA

[56] References Cited
UNITED STATES PATENTS
| | | | |
|---|---|---|---|
| 2,415,389 | 2/1947 | Hunter et al. | 260/462 |
| 2,920,092 | 1/1960 | Bailey | 260/448.2 |
| 2,968,581 | 1/1961 | Kress | 117/139.5 |
| 3,150,190 | 9/1964 | Kress | 260/615 |

Primary Examiner—George F. Lesmes
Assistant Examiner—Patricia C. Ives
Attorneys—Samuel M. Mims, Jr., James O. Dixon, Andrew M. Hassell, Harold Levine, James C. Fails, Melvin Sharp and Richards, Harris and Hubbard ABSTRACT: An acetal-containing organosilicon composition represented by the formula:

(1)

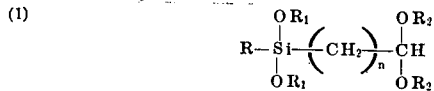

where R is selected from the group consisting of $C_1-C_{18}$ alkyls, $C_4-C_8$ cycloalkyls, aryls, arylalkyls and oxy and halo substituted derivatives thereof;
$R_1$ is selected from the class consisting of $C_1-C_{18}$ alkyls and $C_4C[$ cycloalkyls, aryls and arylalkyls;
$R_2$ is selected from the class consisting of $C_1-C_{18}$ alkyls and $C_4-C_8$ cycloalkyls, and n is an integer from two to 17.

One or such acetal-containing organosilicon compositions is, for example, methyl(diethoxy)(3,3-dimethoxypropyl)silane, which may be represented by the structural formula:

(2)

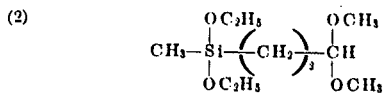

Homopolymers of such acetal-containing organosilicon compositions which have the general formula:

(3)

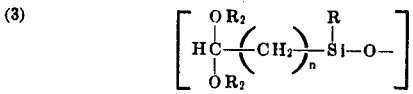

and copolymers of such acetal-containing organosilicon compositions and diorganodialkoxy silanes having the general formula:

4. $(R_3)_2 Si(OR_4)_2$, the copolymer having the general formula:

(5)

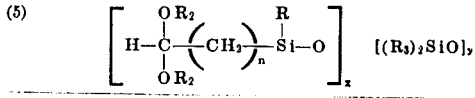

where $R_3$ and $R_4$ are selected from the same groups as $R_1$ and $R_2$, respectively, and x and y represent the mole fraction of each component and both x and y can vary up to one.

Also encompassed is a method for improving the water-repellency of a material containing substantial quantities of cellulose.

METHODS OF USING ACETAL-CONTAINING ORGANOSILICON COMPOSITIONS TO IMPROVE THE WATER-REPELLENCY OF CELLULOSE CONTAINING MATERIALS

This invention relates to the chemistry of organosilicon compounds, and more particularly to acetal-containing organosilicon containing compounds and a method of reacting such compounds with cellulose to improve the water-repellency characteristics of the cellulose.

It is known that certain types of acetal-containing organosilicon compounds can be synthesized. For example, U.S. Pat. No. 2,920,092 describes the synthesis of gamma, gamma-diethoxy propyl-bis(trimethylsiloxy)-methyl silane which may be represented by the following structural formula:

(6)

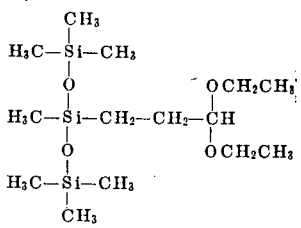

The organosilicon compound (6) is synthesized by first converting acrolein to the acetal by reaction with ethyl orthoformate, as represented by the following equation:

7. $CH_2=CHCHO + HC(OC_2H_5)_3 \rightarrow CH_2=CHCH(OC_2H_5)_2 + H\text{-}COOC_2H_5$ followed by the reaction of the acrolein acetal with heptamethyltrisiloxane in the presence of a small amount of platinum catalyst, as represented by the equation:

(8) $((CH_3)_3SiO)_2 Si(CH_3)H + CH_2=CHCH(OC_2H_5)_2$

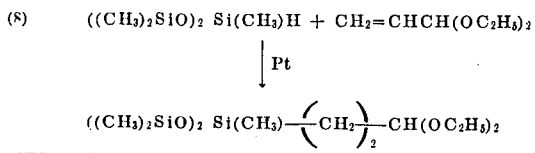

It is also known that silicones can be used to improve the water-repellency characteristics of cellulosic materials such as paper and cotton cloth. However, most applications of silicones makes use of conventional dimethyl, methyl-hydrogen or methyl-vinyl silicones which, in the instance of the latter two materials, can be further polymerized after impregnation into the paper or cotton. The treatments with the above described conventional silicones may or may not provide resistance to dry cleaning or laundering and do not give satisfactory cross-linking of the fibers to give the desired wash and wear properties of crease-retention and wrinkle-resistance.

The present invention provides new acetal-containing organosilicon compounds which may be reacted with a cellulosic material by the method which also forms a part of the present invention to provide a cross-link between an organosilicon group and the cellulosic material to thereby render the material water repellent after heat curing.

The present invention may be generally described as acetal-containing organosilicon compositions represented by formula (1) above, the homopolymers thereof represented in formula (3) and the copolymers thereof represented in formula (5).

The invention also relates to a method for improving the water-repellency characteristics of a material containing substantial quantities of cellulose, such as cotton fabrics and paper by reacting the acetal-containing organosilicon composition identified in formulas (1), (3) and (5) with the material and heat-curing the product of the reaction by, for example, heating the product to a temperature of about 410° F. for a period of about 10 minutes or more.

For a specific description of the conditions and quantities which may be employed to synthesize an acetal-containing organosilicon composition in accordance with the present invention, reference is made to the following example:

EXAMPLE I

Into a reaction vessel containing 113.7 grams (0.846 mole) of methyl(diethoxy)silane:

9. $H(CH_3)Si(OC_2H_5)_2$ was placed a small pellet of crystalline chloroplatinic acid ($H_2Pt Cl_6 \cdot 6H_2O$). The mole ratio of chloroplatinic acid to methyl(diethoxy)silane is preferably about 0.001 to 1, though the ratio may be as low as 0.0001 to 1 or as high as 0.01 to 1. After addition of the chloroplatinic acid, a very rapid reaction occurred, producing a yellow-green coordination complex between the methyl(diethoxy)silane and chloroplatinic acid.

To the complexed liquid in the vessel was added 77.8 grams (0.761 mole) of acrolein dimethyl acetal:

10. $CH_2=CHCH(OCH_3)_2$

The reactants were heated to 50° C. and held at that temperature overnight. The contents of the vessel were then transferred to a distillation flask. During distillation 131.1 grams of methyl(diethoxy) (3,3-dimethoxypropyl)silane, represented in formula (2) above was removed as the fraction which boiled between 50° and 51° C. at a pressure of 0.05–0.06 mm. Hg. The refractive index ($n_D^{25}$) of the methyl(diethoxy)(3,3-dimethoxypropyl)silane was determined to be 1.4137.

The reaction of example I may be generally represented by the following equation:

(11) $H(CH_3) Si(OC_2H_5)_2 + CH=CH-CH(OCH_3)_2$

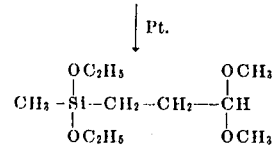

The methyl(diethoxy)(3,3-dimethoxy-propyl)silane produced in example I may be reacted with a cellulosic material as generally represented by the following equation (13) in which cellulose is generally represented by formula (12):

(12)

(13)

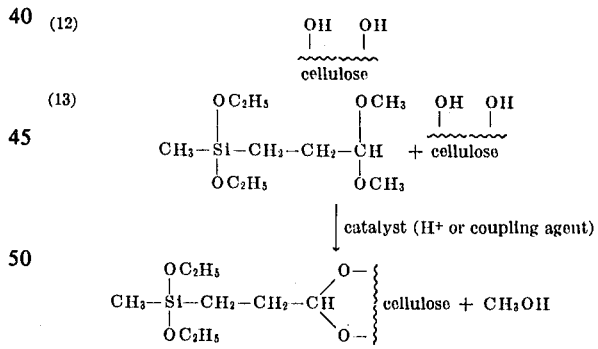

The acetal groups of homopolymers of formula (3) and copolymers of formula (5) undergo the same type of reaction to link with the cellulose molecules.

Thus, the acetal-containing organosilicon compound through transacetalization reacts with the cellulose to link an organosilicon group into the cellulose. It is also possible under acid conditions for the alkoxy silicon group ( Si—$OC_2H_5$) to undergo alcoholysis and form Si—O linkages with the cellulose.

The acetal-containing organosilicon compounds of the present invention will also under acid conditions undergo hydrolysis to form silanols, siloxanes, aldehydes and possibly several inter-reacted polymers. Under basic conditions, the acetal function remains intact and only the alkoxysilane group reacts, generally to give polymeric siloxanes, as, for example by the following condensation reaction involving the composition produced in example I:

(14)

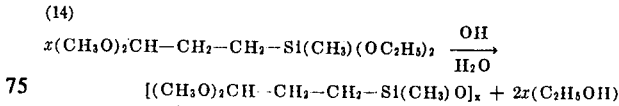

If other alkoxysilanes are present, a copolymer may be formed by a condensation reaction, generally represented by the following equation:

(15)
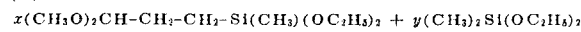
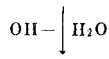
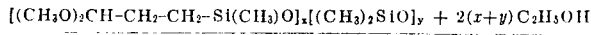

where $x$ and $y$ represent the mole fraction of each component and both $x$ and $y$ can vary from zero to one.

The condensation polymers of acetal-containing organosilicon compositions and condensation copolymers of acetal-containing organosilicons and organoalkoxysilane are also particularly useful as water-repellency agents. To be more particular, reference is made to the following examples, example II of which pertains to the preparation of a condensation homopolymer of methyl(diethoxy)(3,3-dimethoxypropyl)silane; example III of which pertains to the preparation of a condensation copolymer of methyl(diethoxy)(3,3-dimethoxypropyl)silane and dimethyl(diethoxy)silane; example IV of which pertains to use of the homopolymer as a water-repellency agent; and example V of which pertains to the use of the copolymer as a water-repellency agent.

EXAMPLE II

In a reaction vessel were mixed 23.6 grams (0.1 mole) of methyl(diethoxy)(3,3-dimethoxypropyl)silane and 1.8 grams of a 0.98N NaOH solution. The reactants were stirred, while applying gentle heat, for a period of two hours, following which approximately one-fourth pellet of KOH was added. The reactants were then brought to a temperature of 80° C. for 1 hour. Heating was discontinued and the contents of the vessel permitted to stand overnight. The contents of the vessel were then distilled to remove the byproduct alcohol and the excess acetal and water, leaving a reside which was a homopolymer of methyl(diethoxy)(3,3-dimethoxypropyl)silane.

EXAMPLE III

The procedure of example II was followed, except there was reacted 4.72 grams (0.02 mole) methyl(diethoxy)(3,3-dimethoxypropyl)silane, 29.6 grams (0.02 mole) dimethyl(diethoxy)silane, and 3.96 grams (0.22 mole) water, one pellet of KOH being added to provide a basic reaction medium.

As in example II, excess reactants and ethanol were removed by distillation leaving a residue which was a copolymer of the acetal and the diorganodialkoxysilane in a 1 to 10 molar ratio of the former to the latter.

EXAMPLE IV

Into a flask were placed several strips of cotton cloth weighing 1.02 grams, 1.53 grams of the homopolymer prepared in example II, 100 grams benzene and 20 drops of tetraisopropyl titanate marketed under the trademark "Tyzor TPT" which serves as a coupling agent.

The contents of the flask were refluxed overnight following which the temperature of the flask was elevated to strip the liquid of the methanol formed in the reaction. The liquid was, after heating for an additional 2 hours, cooled and a strip of the cotton cloth removed from the liquid. The cotton cloth was lightly squeezed to remove excess benzene and heated to about 410° F. for a period of 10 minutes. The cloth was then removed and placed under a moderate stream of water. No water penetrated the cotton sample, and no wetting was observed.

EXAMPLE V

Into a benzene solution containing 1.0 percent (by weight based on the benzene) of the copolymer prepared in example III were placed several strips of cotton cloth and a trace of p-toluene sulfonic acid. The resulting preparation was refluxed for four hours, during which methanol was removed. The reflux time of 4 hours is an excessive one, and shorter reflux periods may be employed. After the reflux period, the preparation was permitted to cool and set overnight. Strips of the cloth were removed and heated to about 410° F. for a period of 10 minutes, though any temperature between about 300° and 450° F. is satisfactory. The cloth strips when placed under a moderate stream of water completely repelled the stream and completely resisted wetting of the fibers.

The strip of cloth was then placed in a Soxhlet extractor in benzene for an overnight period. The strip of cloth was then removed and air dried. The strip continued to repel water directed against the surface of the cloth.

While rather specific terms have been used to describe embodiments of the invention, they are not intended, nor should they be construed as a limitation upon the invention as defined by the following claims:

1. A method for improving the water repellency characteristics of a material containing substantial quantities of cellulose, comprising the steps of: reacting the copolymer represented by the structural formula:

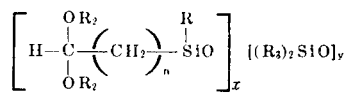

where R is selected from the class containing of $C_1$—$C_{18}$ alkyls, $C_4$—$C_8$ cycloalkyls, aryls, arylalkyls and oxy and halo substituted derivatives thereof, $n$ is an integer from two to 17, $R_2$ is selected from the class consisting of $C_1$—$C_{18}$ alkyls and $C_4$—$C_8$ cycloalkyls, $R_3$ is selected from the class consisting of $C_1$—$C_{18}$ alkyls, $C_4$—$C_8$ cycloalkyls, aryls and arylakyls, and $x$ and $y$ can vary up to 1 with a material containing cellulose, in the presence of a catalyst selected from the group consisting of acids and coupling agents; and heat curing the product of the reaction.

2. The method of claim 1 using the copolymer wherein R, $R_2$ and $R_3$ are all alkyl groups having from one to 18 carbon atoms.

3. The method of claim 1, using the copolymer wherein R, $R_2$ and $R_3$ are all methyl groups.

4. The method of claim 1, wherein said catalyst is p-toluene sulfonic acid.

5. The method of claim 4, using the copolymer wherein R, $R_2$ and $R_3$ are all alkyl groups having from one to 18 carbon atoms.

6. The method of claim 4, using the copolymer of claim 3.

7. The method of claim 1, wherein said catalyst is tetraisopropyl titanate.

8. The method of claim 7, using the copolymer of claim 2.

9. The method of claim 7, using the copolymer of claim 3.